J. J. & T. CLARK.
RABBETING MACHINE.

No. 93,519. Patented Aug. 10, 1869.

Witnesses.
N. H. Sherburne
S. D. Wilder

Inventor.
J. J. Clark
Thomas Clark

United States Patent Office.

JOHN J. CLARK AND THOMAS CLARK, OF ELGIN, ILLINOIS.

Letters Patent No. 93,519, dated August 10, 1869.

IMPROVEMENT IN RABBETING-MACHINE.

The Schedule referred to in these Letters Patent and making part of the same.

*To all whom it may concern:*

Be it known that we, JOHN J. CLARK and THOMAS CLARK, of Elgin, in the county of Kane, and State of Illinois, have invented a new and useful Improvement in Machinery for Rabbeting Door-Panels; and we do hereby declare the following to be a full, clear, and exact description thereof, reference being had to the accompanying drawings, making a part of this specification, in which—

Similar letters of reference, where they occur in the separate figures, denote like parts in both of the drawings.

Figure 1:
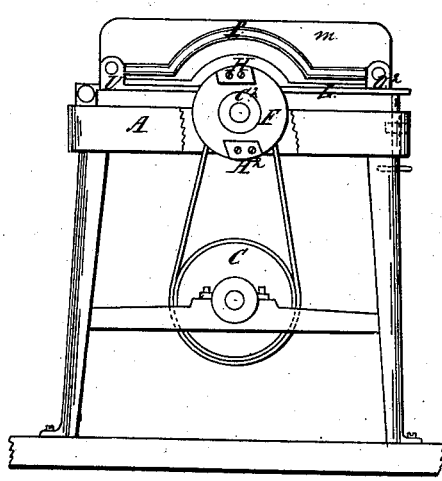
Figure 1 is a side elevation of our invention.

The nature of our improvement consists in two rotating cutters on a horizontal shaft, and so arranged as to admit of lateral adjustment, or of being moved on said shaft, in the direction of its length, to any graduated distance, one from the other, the cutting-edges thereof coming in contact with and against opposite sides of the board as the same is forced or passes over the table, thus cutting away its outer edges, forming the rabbet on both sides of the panel at one operation, whereby a great saving of time and labor is obtained.

To enable others skilled in the art to construct and use our invention, we will proceed to describe the same with reference to the drawings.

A represents the frame of the machine, which may be of wood or metal, and of any suitable form of construction.

B, the main or driving-shaft, which extends across from side to side of the frame.

On said shaft is the main driving-wheel C, around which passes belt D.

Said belt extends upward and around pulley $C^2$ on shaft $B^2$, which is attached to the top or upper portion of frame A, by means of boxes E and $E^2$, forming the bearings thereof.

On said shaft $B^2$ are two disks, F and $F^2$, so arranged as to be capable of lateral adjustment, or of being moved in the direction of the length of said shaft, and firmly held thereon at any graduated distance, one from the other, by means of set-screws, $e$ and $e''$.

Cut through and across the outer rim of said disks are mortises or slots, 1 and 2, more or less, cut at right angles with the face of the disk.

Within said slots or mortises are cutter-blades, H and $H^2$, firmly attached by means of screws or bolts, $f$ and $f''$. The cutting-edges of the blades protrude outward from the face of the disk, and are so arranged as to bring the edges of the blades in one disk toward the edges in the other.

The objects of this style of cutters are several:

First, the blades may be so shaped as to work the shoulder of the rabbet in the form of a moulding, and by arranging the same as described, the rabbet is worked on both sides of the panel at one operation; and Second, by making the same adjustable, the rabbet can be worked to any desired depth, and on thick or thin material, as is often found necessary in manufacturing doors.

L, in the drawings, represents the table or platform, which is hinged at one end to the end and top of the frame, and so arranged as to allow the opposite end to have a vertical tilting movement, and is held at any proper adjusted height by means of screw N, which passes upward through the top of the frame and against the bottom of the platform.

At or near the centre of the table is a guide, $m$, which extends its entire length, and is also capable of being adjusted laterally, and held at any given distance from disk $F^2$, by means of screws $l\ l'$.

Figure 2:
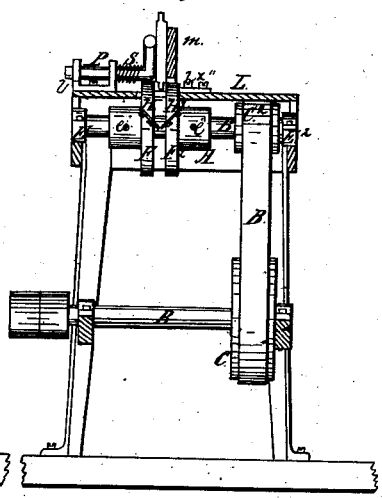
Figure 2 is a vertical transverse central section of the same on line $e\ e$.
Figure 3:
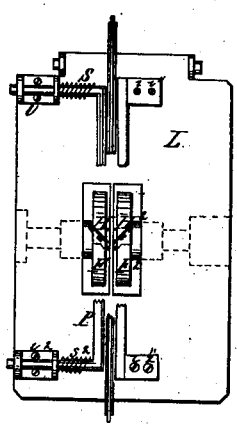
Figure 3 is a plan of the top, taking in the cutting-device.

Attached to the outer side of said table are standards U and $U^2$, which receive a self-adjusting frame, P, that extends toward the centre of the table and over disk F. The centre of said frame is bent upward, to admit of the movement, and is provided with spiral springs S $S^2$, which pass around the same between standards U $U^2$ and the bent portion thereof, which brings frame P in contact with or against the panel, forcing the same against guide $m$, thus holding the panel in a vertical position as it passes over the cutters which form the rabbet thereon, as is shown at $n$, fig. 2.

Having thus described the nature and object of our invention,

What we claim as our invention, and desire to secure by Letters Patent, is—

The laterally-adjustable cutter-heads F $F^2$, in combination with the hinged table L, curved spring frame P, and guide $m$, when all the parts are constructed and operated as described, for the purpose set forth.

JOHN J. CLARK.
THOMAS CLARK.

Witnesses:
N. H. SHERBURN,
S. D. WILDER.